(12) United States Patent
Sinkko et al.

(10) Patent No.: US 8,277,611 B2
(45) Date of Patent: Oct. 2, 2012

(54) PAPER AND METHOD FOR MAKING PAPER

(75) Inventors: Tarja Sinkko, Lappeenranta (FI);
Mikko Oksanen, Lappeenranta (FI);
Janne Varvemaa, Lappeenranta (FI);
Kyösti Haapoja, Valkeakoski (FI);
Teuvo Leppänen, Taavetti (FI)

(73) Assignee: UPM-Kymmene Oyj, Helsinki (FI)

( * ) Notice: Subject to any disclaimer, the term of this patent is extended or adjusted under 35 U.S.C. 154(b) by 0 days.

(21) Appl. No.: 12/597,714

(22) PCT Filed: Apr. 25, 2008

(86) PCT No.: PCT/FI2008/050229
§ 371 (c)(1),
(2), (4) Date: Jan. 14, 2010

(87) PCT Pub. No.: WO2008/132284
PCT Pub. Date: Nov. 6, 2008

(65) Prior Publication Data
US 2010/0132902 A1    Jun. 3, 2010

Related U.S. Application Data

(60) Provisional application No. 61/022,407, filed on Jan. 21, 2008.

(30) Foreign Application Priority Data

Apr. 25, 2007  (FI) ..................................... 20075286

(51) Int. Cl.
*D21H 11/00* (2006.01)

(52) U.S. Cl. .................................................. 162/164.1

(58) Field of Classification Search ............... 162/164.1, 162/158, 174, 175, 181.1, 181.3, 181.6, 181.8; 428/195.1, 207
See application file for complete search history.

(56) References Cited

U.S. PATENT DOCUMENTS

| | | |
|---|---|---|
| 3,784,596 A | 1/1974 | Nagler |
| 4,460,637 A | 7/1984 | Miyamoto et al. |
| 5,334,449 A | 8/1994 | Bergmann et al. |
| 5,468,564 A | 11/1995 | Ohtani et al. |
| 5,614,325 A | 3/1997 | Chartier et al. |
| 5,858,555 A | 1/1999 | Kuroyama et al. |
| 5,972,147 A | 10/1999 | Janis |
| 6,465,086 B1 | 10/2002 | Kitamura et al. |
| 6,616,749 B1 | 9/2003 | Husband et al. |
| 6,767,618 B2 | 7/2004 | Ishige et al. |
| 2002/0182382 A1 | 12/2002 | Hirabayashi et al. |
| 2005/0191469 A1* | 9/2005 | Anttila et al. ............... 428/195.1 |
| 2006/0014004 A1 | 1/2006 | Iwasa et al. |
| 2006/0122059 A1 | 6/2006 | Mathur et al. |
| 2006/0251819 A1 | 11/2006 | Zama et al. |
| 2010/0189969 A1* | 7/2010 | Oksanen et al. ............... 428/207 |

FOREIGN PATENT DOCUMENTS

| | | |
|---|---|---|
| CN | 1630757 A | 6/2005 |
| EP | 0 179 597 A2 | 4/1986 |
| EP | 1 026 003 A2 | 8/2000 |
| EP | 1 743 976 A1 | 1/2007 |
| JP | 8-027694 A | 1/1996 |
| JP | 8-132730 A | 5/1996 |
| JP | 2000-045199 A | 2/2000 |
| JP | 2000-226792 A | 8/2000 |
| JP | 2003-113594 A | 4/2003 |
| JP | 2004-011053 A | 1/2004 |
| JP | 2005-530934 A | 1/2004 |
| JP | 2004-204409 A | 7/2004 |
| JP | 2005-530934 A | 10/2005 |
| WO | WO2004/003293 A1 | 1/2004 |
| WO | WO 2004/003293 A1 | 1/2004 |

OTHER PUBLICATIONS

Supplementary European Search Report for corresponding European Patent Application No. 08761632 mailed Mar. 9, 2011.
Japanese Office Action for corresponding Japanese Patent Application No. 2010-504776 mailed Jan. 10, 2012.
Chinese Office Action for corresponding Chinese Patent Application No. 200880013721.9 mailed Feb. 13, 2012.

* cited by examiner

*Primary Examiner* — Mark Halpern
(74) *Attorney, Agent, or Firm* — Merchant & Gould P.C.

(57) ABSTRACT

The invention relates to a paper that is formed of a fiber-based source material and is applicable as printing paper. According to the invention, the surface of the paper is surface-treated by arranging on the surface sufficient density in such manner that the density of at least one surface layer of the paper is sufficiently high to yield a Gurley-Hill value of over 7000 s/100 ml as measured from the entire paper. Furthermore, the invention relates to a method for making paper.

21 Claims, No Drawings

PAPER AND METHOD FOR MAKING PAPER

This application is a National Stage Application of PCT/FI2008/050229, filed Apr. 25, 2008, which claims benefit of Ser. No. 61/022,407, filed Jan. 21, 2008 in the United States of America, and which claims benefit of Serial No. 20075286, filed Apr. 25, 2007 in Finland and which applications are incorporated herein by reference. To the extent appropriate, a claim of priority is made to each of the above disclosed applications.

FIELD OF THE INVENTION

The invention relates to paper and the method for making paper wherein paper that is applicable as printing paper is formed of a fibre-based source material.

BACKGROUND OF THE INVENTION

Known from prior art are different printing papers for use in printing and different methods for making papers.

In the printing art, different printing methods for paper are known, e.g. Offset or gravure techniques. In the known methods, specifically in HSWO printing, printing inks are dried at high temperatures, typically at 120-150° C., which provides high moisture gradient between the printed and non-printed areas during drying of the printing ink. The high moisture gradient thus provided constitutes an important factor that weakens the quality of the HSWO print, namely waving. There are many known ways which aim at reducing the waving.

Reference publication WO 2004/003293 discloses a dense paper with an oleophilic surface. The Gurley-Hill permeance value on the surface is higher than 5000 s/100 ml. Forming a dense paper with an oleophilic surface is expensive and has not been realized industrially.

OBJECTIVE OF THE INVENTION

The objective of the invention is to disclose a new type of paper that is applicable as printing paper in printing. One specific objective of the invention is to disclose a paper that allows minimizing the moisture gradient between printed and non-printed surface and avoiding waving e.g. in HSWO printing. One further objective of the invention is to disclose a new method for making paper.

SUMMARY OF THE INVENTION

The paper and method according to the invention are characterized by what has been presented in the claims.

The invention is based on a paper that is formed of a fibre-based source material and is applicable as printing paper. According to the invention, the surface of the paper is surface-treated by arranging on the surface of the paper, at least on one side, sufficient density in such manner that the density of at least one surface layer of the paper is sufficiently high to yield a Gurley-Hill value of over 7000 s/100 ml as measured from the entire paper and determined by the Gurley-Hill process.

In this context, surface layer of the paper refers to a surface layer on the surface of the paper, e.g. a coating layer, that may be formed by any surface treatment process known per se. There are at least two surface layers on the surface of the paper. In this case, the surface layer may refer to the topmost surface layer or any other surface layer under the topmost layer.

The invention is specifically based on paper in which at least one surface layer of the paper is arranged to be dense and which comprises controlled surface density. Furthermore, the paper preferably comprises controlled surface energy properties. Preferably, the surface of the paper does not have any oleophilic properties.

In the paper according to the invention, the moisture gradient, i.e. drying gradient, between the printed and non-printed surface can be minimized, and waving can be reduced e.g. in HSWO printing. Minimizing the moisture gradient becomes possible by providing the density to the paper in a specific manner. With dense paper surface, it is possible to slow down drying of the non-printed surface relative to the printed surface, so that the moisture gradient, can be reduced e.g. in HSWO drying. By reducing the moisture gradient, it is possible to reduce waving in the paper.

In this context, paper refers to any fibre-based paper. The paper may be made from chemical pulp, mechanical pulp, chemimechanical pulp, recycled pulp and mixtures thereof, and/or the like. The paper may be in the form of a wet web, dried web or sheet, or in other form which is suitable for the purpose. The paper may comprise suitable fillers and additives.

The Gurley-Hill process (ISO 5636-5:2003) comprises measuring the time consumed during printing through paper having a specific air permeability, e.g. 100 ml, e.g. in seconds. The pressure difference is 1.21 kPa.

In one embodiment of the invention, the paper is surface-treated by multilayer treatment in which more than one surface layers are formed on the surface of the paper. The paper may be double coated or it may be coated multiple times. In papers that are coated multiple times and in double coated papers it is sufficient that at least one of the surface layers is densified in the manner defined by the invention. Alternatively, more than one of the surface layers are densified in the manner defined by the invention.

In one embodiment of the invention, the paper is surface-treated by coating and/or surface-sizing so that at least two surface layers, i.e. coating layers, are formed on the surface of the paper. In one preferred embodiment, the layer which is against the surface of the paper, i.e. the lowest surface layer, is made by coating.

In one embodiment of the invention, the paper is surface-treated by pre-coating the surface of the paper. In one embodiment, the paper is pre-coated in order to provide sufficient density on one surface layer, i.e. the pre-coating layer. In a preferred embodiment, at least one other coating layer that may be or is not dense in the manner according to the invention is arranged onto the pre-coating layer.

The densifying layer may be any layer. In one embodiment, the densifying layer is the pre-coating layer. In one embodiment, the densifying layer is the topmost surface layer. In one embodiment, the densifying layer is one of the interlayers. In one preferred embodiment, the topmost surface layer is not the densifying layer, in which case any desired properties, e.g. in terms of printability, may be arranged on the topmost surface layer.

In one embodiment, the coat weight of one surface layer, preferably the densifying layer, is 1-14 g/m²/side, more preferably 6-14 g/m²/side. In one embodiment, the total coat weight is 7-40 g/m²/side.

In one embodiment of the invention, a mixture comprising at least one pigment and/or at least one bonding agent is arranged on the surface of the paper in order to form at least one surface layer. In one embodiment, the mixture comprises at least one pigment and at least one bonding agent.

In one embodiment of the invention, the pigment is selected from the group of: kaolines, talcs, calcium carbonates, gypsum, and mixtures thereof and suchlike pigments. In one preferred embodiment, the pigment comprises mainly kaoline. In one embodiment, plate-shaped pigment is used as the pigment at least partly or entirely. In one embodiment, substantially plate-shaped pigment is used, in a preferred embodiment the plate-shaped pigment is present in an amount of over 70% by weight of the amount of pigment, in a more preferred embodiment in an amount of over 90% by weight of the amount of pigment. In one embodiment, the pigment may comprise spherical pigment.

In one embodiment of the invention, the bonding agent is selected from the group of: starches, proteins, latexes, carboxy-methyl cellulose, polyvinyl alcohol and mixtures thereof and the like. In one preferred embodiment, the bonding agent comprises mainly latex or the derivatives thereof, e.g. SB latex.

In one embodiment, the bonding agent comprises latex having the glass transition temperature in the range of −30-35° C., more preferably in the range of 0-25° C. The glass transition temperature may be defined e.g. by differential scanning calorimetry (DSC).

The mixture arranged on the surface of the paper may be any surface treatment composition, e.g. a coating agent (coating colours) or a surface-size composition.

In one embodiment of the invention, the density of the surface of the paper is controlled by optimizing the surface treatment mixture composition by the bonding agent-pigment combination. In one embodiment, the ratio of pigment to bonding agent is predetermined. The ratio of bonding agent to pigment may vary in the range of 1:100-100:1. In one embodiment of the invention, the mixture arranged on the surface of the paper, e.g. the coating mixture, comprises pigment in an amount of 75-95% by weight of the total dry weight of the mixture, in one embodiment in an amount of 82-92% by weight of the total dry weight of the mixture. The pigment may be in solid or in dispersion form, and it may be present as a composition in which the pigment comprises 30-100% by weight. In one embodiment of the invention, the mixture comprises bonding agent in an amount of 5-25% by weight of the total dry weight of the mixture, in one embodiment 8-17% by weight of the total dry weight of the mixture. The bonding agent may be in solid or in solution form and it may be present as a composition comprising bonding agent in an amount of 3-100% by weight. In one embodiment, the surface treatment composition comprises pigment in an amount of 100 parts of the dry weight and bonding agent in an amount of 10-15 parts of the dry weight.

Any suitable bonding agents and pigments can be used in the surface treatment of the paper. Furthermore, suitable additives known per se in the art can be added to the surface treatment mixture. The mixture may comprise additives in an amount of 0-10% by weight.

In one embodiment of the invention, the density of at least one surface layer of the paper is sufficiently high to yield a Gurley-Hill value of over 10000 s/100 ml as determined by the Gurley-Hill process and measured from the entire paper. In one embodiment, the density of the paper is over 12000 s/100 ml as measured by the Gurley-Hill process.

In one embodiment of the invention, the paper is calendered, preferably after the surface treatment.

In one embodiment of the invention, the paper can be used as printing paper in Offset printing, specifically HSWO printing.

In the manufacture of the paper according to the invention, the so-called base paper used may be a suitable fibre-based base paper which can be formed according to the invention into paper that is applicable as printing paper, such as LWC (Light Weight Coated), MWC (Medium Weight Coated), MFC (Machine Finished Coated), WFC paper (Wood Free Coated) or similar paper.

In one embodiment, fillers, pigments, bonding agents and/or other chemicals are added to the fibre-based source material in the manufacture of the paper. Any agents and chemicals known in the art may be used as fillers, pigments, bonding agents and chemicals.

Furthermore, the invention is based on a method for making paper, wherein paper that is applicable as printing paper is formed of a fibre-based source material. According to the invention, the surface of the paper and at least one side thereof is surface-treated in order to arrange sufficient density on the surface in such manner that the density of at least one surface layer of the paper is sufficiently high to yield a Gurley-Hill value of over 7000 s/100 ml as measured from the entire paper.

The manufacture, coating, surface-sizing, calendering and/or printing etc. of the paper may be performed in manners known per se in the art.

In coating the paper, any coating process can be applied, e.g. film transfer coating, blade coating with nozzle applicator, blade coating with roll applicator, blade coating with SDTA (short dwell time application), spray coating or curtain coating or any combinations thereof, or similar processes.

The paper and method according to the invention provide considerable advantages compared to the prior art.

Thanks to the paper according to the invention, high-quality printed matter and reduction of waving in printed paper are provided. Minimizing the moisture gradient reduces the amount of energy required in the drying, because the drying is more biased towards the surface of the printed paper. Furthermore, excessive evaporation of water from the paper would weaken the printing quality of the paper.

The invention provides a simple and cost-effective way of making high-quality paper that is applicable as printing paper. Furthermore, the invention provides an industrially applicable, easy, simple and affordable way of making paper.

DETAILED DESCRIPTION OF THE INVENTION

In the following section, the invention will be described with the aid of detailed exemplary embodiments.

Example 1

In this example, double coated MWC-type paper according to the invention that was applicable as printing paper and had the grammage of about 80 gsm was formed. The base paper was wood-containing. The paper was pre-coated by film transfer coating and surface-coated by blade coating with nozzle applicator. The pre-coat weight was 8 g/m$^2$/side. The surface-coat weight was 8 g/m$^2$/side. After coating, the paper was supercalendered and the calendering conditions were selected to obtain the gloss level of 70%.

The pre-coating mixture used in the printing paper according to the invention was a mixture including 100 parts plate-shaped kaoline pigment, 10 parts SB latex as bonding agents and 4 parts starch, and 1.8 parts additives, e.g. rheology modifiers and dyes. The particle size distribution of the pigment was as presented in Table 1 as measured by a Sedigraph 5100 device.

TABLE 1

| Particle size, μm | Cumulative distribution, % |
| --- | --- |
| less than 10 | 99.3 |
| less than 5 | 96.9 |
| less than 2 | 81.3 |
| less than 1 | 63.8 |
| less than 0.5 | 37.2 |

The surface coating layer used in the printing paper according to the invention was the typical mixture of kaoline and carbonate.

The density of the printing paper according to the invention was determined as 11600 s/100 ml.

Example 2

In this example, double coated MWC-type paper according to the invention that was applicable as printing paper and had the grammage of about 80 gsm was formed. The base paper was wood-containing. The paper was pre-coated by film transfer coating and surface-coated by blade coating with nozzle applicator. The pre-coat weight was 7 g/m$^2$/side. The surface-coat weight was 8 g/m$^2$/side. After coating, the paper was supercalendered and the calendering conditions were selected to obtain the gloss level of 70%.

The pre-coating mixture used in the printing paper according to the invention was a mixture including 100 parts plate-shaped kaoline pigment, 16 parts SB latex as bonding agent and 3.3 parts additives, e.g. rheology modifiers and dyes. The particle size distribution of the pigment was as presented in Table 2 as measured by the Sedigraph 5100 device.

TABLE 2

| Particle size, μm | Cumulative distribution, % |
| --- | --- |
| less than 10 | 100 |
| less than 5 | 99.6 |
| less than 2 | 86.7 |
| less than 1 | 71.3 |
| less than 0.5 | 53.8 |

The reference paper used was commercial double coated wood-based MWC paper that had the grammage of 80 gsm and was supercalendered to the gloss level of 70%. The typical coating mixture based on calcium carbonate was used in pre-coating the reference paper.

The surface coating layer used in the printing paper according to the invention and in the reference paper was the typical mixture of kaoline and carbonate.

The following density values were defined for the papers: in the printing paper according to the invention 28250 s/100 ml, thanks to the pre-coating layer, and in the reference paper 2800 s/100 ml, as determined by the Gurley-Hill process.

The papers were printed by HSWO printing, using the Albert Frakenthal A 101 S printing machine. Commercial HSWO printing ink was used in the printing. The exit temperature of the web was 130° C. after drying.

After printing, considerable improvement in terms of waving was observed in the printing paper according to the invention during visual inspection when the printing paper according to the invention was compared with the reference paper. Waving can be measured e.g. by AFT process, by determining the AFT value after printing and drying.

The manufacture, coating, calendering and printing of the paper were performed in manners known per se and are not described in any more detail in this context.

In all tests, the papers according to the invention proved to be good printing papers on the base of waving of the paper and evenness and sharpness of the print.

In the tests it was observed that waving was low in HSWO printing due to the dense surface structure of the paper and the low moisture gradient between printed and non-printed surface.

In summary, one can conclude that the method according to the invention provides easily good-quality printing paper.

The paper and method according to the invention are applicable in different embodiments for making most different kinds of printing paper products.

The invention is not limited merely to the example referred to above; instead many variations are possible within the scope of the inventive idea defined by the claims.

The invention claimed is:

1. A paper that is formed of a fibre-based source material and is applicable as printing paper, wherein there are at least two coating layers on the surface of the paper, and the coating layers are arranged by multilayer treatment on the surface of the paper and the surface of the paper is surface-treated by arranging sufficient density on the surface in such manner that the density of at least one coating layer of the paper is sufficiently high to yield a Gurley-Hill value of over 7000 s/100 ml as measured from the entire paper and by forming the paper without oleophilic properties on the surface of the paper and wherein the surface of the paper does not have oleophilic properties.

2. The paper according to claim 1, wherein the paper is surface-treated by coating and/or surface-sizing.

3. The paper according to claim 1, wherein the paper is surface-treated by multilayer treatment in which more than one surface layers are formed on the surface of the paper.

4. The paper according to claim 1, wherein the paper is surface-treated by pre-coating in order to provide sufficient density on one surface layer.

5. The paper according to claim 1, wherein the coat weight of the densifying surface layer on the surface of the paper is 1-14 g/m$^2$/side.

6. The paper according to claim 1, wherein a mixture comprising pigment and bonding agent is arranged on the surface of the paper in order to form at least one surface layer.

7. The paper according claim 6, wherein the pigment is selected from the group of: kaolines, talcs, carbonates, gypsum and mixtures thereof.

8. The paper according to claim 6, wherein plate-shaped pigment is used at least partly as the pigment.

9. The paper according to claim 6, wherein the bonding agent is selected from the group of: starches, proteins, latexes, carboxy-methyl cellulose, polyvinyl alcohol and mixtures thereof.

10. The paper according to claim 6, wherein the mixture comprises pigment in an amount of 75-95% by weight of the dry weight.

11. The paper according to claim 6, wherein the mixture comprises bonding agent in an amount of 5-25% by weight of the dry weight.

12. The paper according to claim 1, wherein the density of at least one surface layer of the paper is sufficiently high to yield a Gurley-Hill value of over 10000 s/100 ml as measured from the entire paper.

13. The paper according to claim 1, wherein the density of at least one surface layer of the paper is sufficiently high to yield a Gurley-Hill value of over 12000 s/100 ml as measured from the entire paper.

14. The paper according to claim 1, wherein the paper is calendared.

15. The paper according to claim 1, wherein the paper is applicable as printing paper in HSWO printing.

16. A method for making paper, wherein paper that is applicable as printing paper is formed of a fibre-based source material, wherein at least two coating layers are arranged by a multilayer treatment on the surface of the paper and the surface of the paper is surface-treated in order to arrange sufficient density on the surface in such manner that the density of at least one coating layer of the paper is sufficiently high to yield a Gurley-Hill value of over 7000 s/100 ml as measured from the entire paper and to form the paper without oleophilic properties on the surface of the paper and wherein the surface of the paper and wherein does not have any oleophilic properties.

17. The method according to claim 16, wherein the surface of the paper is surface-treated by coating and/or surface-sizing.

18. The method according to claim 16, wherein a mixture comprising pigment and bonding agent is arranged on the surface of the paper in order to form at least one surface layer.

19. The method according to claim 16, wherein the paper is surface-treated by multilayer treatment in which more than one surface layers are formed on the surface of the paper.

20. The method according to claim 16, wherein the paper is surface-treated by pre-coating the surface in order to provide sufficient density on one surface layer.

21. The method according to claim 16, the paper is calendered.

* * * * *